United States Patent
Heller, Jr.

(10) Patent No.: US 8,688,920 B2
(45) Date of Patent: Apr. 1, 2014

(54) COMPUTING SYSTEM WITH GUEST CODE SUPPORT OF TRANSACTIONAL MEMORY

(75) Inventor: Thomas J. Heller, Jr., Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 1043 days.

(21) Appl. No.: 11/928,857

(22) Filed: Oct. 30, 2007

(65) Prior Publication Data

US 2008/0288238 A1 Nov. 20, 2008

Related U.S. Application Data (63) Continuation-in-part of application No. 11/748,044, filed on May 14, 2007, now Pat. No. 8,321,637.

(51) Int. Cl.
*G06F 9/52* (2006.01)

(52) U.S. Cl.
USPC .......................................... 711/150; 707/703

(58) Field of Classification Search
USPC .................... 707/703; 711/147–153
See application file for complete search history.

(56) References Cited

U.S. PATENT DOCUMENTS

| | | | |
|---|---|---|---|
| 3,686,641 A | | 8/1972 | Logan et al. |
| 5,428,761 A | | 6/1995 | Herlihy et al. |
| 5,553,291 A | * | 9/1996 | Tanaka et al. ............ 718/1 |
| 5,701,432 A | | 12/1997 | Wong et al. |
| 5,742,785 A | | 4/1998 | Stone et al. |
| 5,946,711 A | | 8/1999 | Donnelly |
| 5,963,922 A | | 10/1999 | Helmering |
| 5,974,438 A | | 10/1999 | Neufeld |
| 6,035,379 A | | 3/2000 | Raju et al. |
| 6,360,220 B1 | | 3/2002 | Forin |
| 6,360,231 B1 | | 3/2002 | Pong et al. |
| 6,381,676 B2 | | 4/2002 | Aglietti et al. |
| 6,510,498 B1 | | 1/2003 | Holzle et al. |
| 6,611,906 B1 | | 8/2003 | McAllister et al. |
| 6,651,146 B1 | | 11/2003 | Srinivas et al. |
| 6,738,837 B1 | | 5/2004 | Wyland |
| 6,826,757 B2 | | 11/2004 | Steele, Jr. et al. |
| 6,862,664 B2 | | 3/2005 | Tremblay et al. |
| 6,874,065 B1 | | 3/2005 | Pong et al. |
| 6,880,045 B2 | | 4/2005 | Pong et al. |
| 6,880,071 B2 | | 4/2005 | Steele, Jr. et al. |

(Continued)

OTHER PUBLICATIONS

Moore, Kevin et al., LogTM: Log-Based Transactional Memory, Feb. 15, 2006, 12th Annual International Symposium on High Performance Computer Architecture (HPCA-12).*

(Continued)

*Primary Examiner* — April Y Blair
*Assistant Examiner* — Nicholas Simonetti
(74) *Attorney, Agent, or Firm* — Cantor Colburn LLP; John Campbell (57) ABSTRACT

A data structure of readily accessible units of memory is provided as computer useable media having computer readable program code logic providing information tables and a software emulation program to enable hardware to run new software that uses transactional memory and a bit associated with a transaction for executing transactional memory constructs. The data structure with Guest PTRAN bit is used in emulation of software written for a given computer on a different computer which executes a different set of instructions. The emulating instructions are used to provide transactional memory instructions on a computer which does not support those instructions natively.

28 Claims, 6 Drawing Sheets

(56) References Cited

U.S. PATENT DOCUMENTS

| | | | |
|---|---|---|---|
| 6,938,130 | B2 | 8/2005 | Jacobson et al. |
| 6,981,110 | B1 | 12/2005 | Melvin |
| 7,000,234 | B1 | 2/2006 | Shavit et al. |
| 7,017,160 | B2 | 3/2006 | Martin et al. |
| 7,039,794 | B2 | 5/2006 | Rodgers et al. |
| 7,089,374 | B2 | 8/2006 | Tremblay et al. |
| 7,107,402 | B1 | 9/2006 | Melvin |
| 7,117,502 | B1 | 10/2006 | Harris |
| 7,178,062 | B1 | 2/2007 | Dice |
| 7,865,701 | B1 | 1/2011 | Tene et al. |
| 2002/0072071 | A1 | 6/2002 | Kientsch-Engel et al. |
| 2002/0161815 | A1* | 10/2002 | Bischof et al. ............... 709/101 |
| 2003/0066056 | A1 | 4/2003 | Petersen et al. |
| 2003/0079094 | A1 | 4/2003 | Rajwar et al. |
| 2003/0084038 | A1 | 5/2003 | Balogh et al. |
| 2003/0204682 | A1 | 10/2003 | Ueno |
| 2004/0034673 | A1 | 2/2004 | Moir et al. |
| 2004/0152948 | A1 | 8/2004 | Kim |
| 2004/0162948 | A1 | 8/2004 | Tremblay et al. |
| 2004/0187127 | A1 | 9/2004 | Gondi |
| 2004/0267828 | A1 | 12/2004 | Zwillig |
| 2005/0060559 | A1 | 3/2005 | McKenney |
| 2005/0086446 | A1 | 4/2005 | McKenney et al. |
| 2006/0085591 | A1* | 4/2006 | Kumar et al. ............... 711/113 |
| 2006/0173885 | A1 | 8/2006 | Moir et al. |
| 2006/0206692 | A1 | 9/2006 | Jensen |
| 2006/0212456 | A1 | 9/2006 | Earhart |
| 2006/0288173 | A1 | 12/2006 | Shen |
| 2007/0028056 | A1 | 2/2007 | Harris |
| 2007/0028058 | A1 | 2/2007 | Bradley et al. |
| 2007/0186056 | A1* | 8/2007 | Saha et al. ............... 711/144 |
| 2007/0282838 | A1* | 12/2007 | Shavit et al. ............... 707/8 |
| 2007/0300238 | A1* | 12/2007 | Kontothanassis et al. .... 719/320 |
| 2008/0288727 | A1 | 11/2008 | Baum et al. |

OTHER PUBLICATIONS

Grinberg et al; "Investigation of Transactional Memory Using FPGAs", School of Electrical Engineering, Tel Aviv University, Tel Aviv ISRAEL, pp. 1-4.
Harris et al, "Transactional Memory with Data Invariants", pp. 1-12.
Shriraman et al. "Hardware Acceleration of Software Transactional Memory", May 18, 2006, pp. 1-10.
Chung et al. "Tradeoffs in Transactional Memory Virtualization", ASPLOS '06 Oct. 21-25, 2006, pp. 1-12.
"Thread: (Computer Science)" Wikipedia, http://en.wikipedia.org/wiki/Thread_(computer_science), pp. 1-7.
Wood, "Transactional Memory—An Overview of Hardware Alternatives", Transactional Memory Workshop, Apr. 8, 2005, pp. 1-22.
Soltis, "Inside the AS/400", 2nd Edition, Duke Press, pp. 1-6.
Katz et al. Implementing a Cache Consistency Protocol, Research Paper, Electrical Engineering and Computer Science Department, University of California Berkely, pp. 1-31.
Banatre et al. "Cache Management in a Tightly Coupled Fault Tolerant Multiprocessor", 1990 IEEE, pp. 1-8.
"Securing Your Future with HP: A Transition Guide for Tru64 UNIX Customers", http://whitepapers.techrepublic.com.com/whitepaper.aspx?docid=275665&promo=100510, pp. 1-3.
"Native POSIX Thread Library", http://en.wikipedia.org/wiki/Native_POSIX_Thread_Library, pp. 1-3.
"Software Transactional Memory", Wikipedia, http://wikipedia.org/wiki/Software_transactional_memory, pp. 1-6.
Dice et al. "Transactional Locking II", pp. 1-15.
"Programming in the Age of Concurrency: Software Transactional Memory", http://channel9.msdn.com/Showpost.aspx?postid=231495, pp. 1-17.
Herlihy et al. "Transactional Memory: Architectural Support for Lock-Fred Data Structures", 1993 IEEE, pp. 289-300.
Herlihy "What Can We Prove About Transactional Memory?", Brown University, pp. 1-67.
Rajwar et al. "Speculative Lock Elision: Enabling Highly Concurrent Multithreaded Execution", 2001 IEEE, pp. 294-305.
Mohamed "The Posix Interface for the Unicon Programming Language", http://www.drones.com/unicon/, pp. 1-21.
Wheeler "Secure Programmer: Prevent Race Conditions", http://www-128.ibm.com/developerworks.linux/library/1-sprace.html, pp. 1-10.
"Multithreaded Programming Guide Products and Services", http://docsun.cities.uiuc.edu/sun_docs/C/solaris_9/SUNWdev/MTP/p56.html, pp. 1-4.
"Multithreaded Programming Guide" http://docs.sun.com/app.docs/doc/806-6867/6jfpgdcop?1=sv&a=view, pp. 1-13.
"Writing Multithreaded Java Applications", http://www-128.ibm.com/developerworks/java/library/]-thread.html, pp. 1-7.
Lee "The Problem with Threads", Innovative Technology for Computing Professionals, May 2006, pp. 1-19.
Kongetira et al. "Niagara: A 32-Way Multithreaded Sparc Processor", 2005 IEEE, pp. 21-29.
Rajwar et al. "Virtualizing Transactional Memory", pp. 1-12.
Ananian et al. "Unbounded Transactional Memory", Research Abstracts 2006. CSAIL Publications and Digital Archive, pp. 1-4.
Hammond et al. "Transactional Memory Coherence and Consistency", Stanford University, pp. 1-12.
"Tuple Space", http://c2.com/cgi/wild?TupleSpace, pp. 1-5.
McDonald et al. "Architectural Semantics for Practical Transactional Memory", Computer Systems Laboratory Stanford University, pp. 1-12.
Kuszmaul et al. "Transactions Everywhere", http://www.cs.wlsc.edu/~rajwar/tm-workshop/position_statements.htm, pp. 1-19.
L.C. Heller et al. "Millicode in an IBM zSeries Processor"; IBM Journal of Research & Development, vol. 48, No. 3/4, May/Jul. 2004, pp. 425-434.
Moore, Kevin et al., Log™: Log Based Transactional Memory, Feb. 15, 2006, 12th Annual International Symposium on High Performance Computer Architecture (HPCA-12), U.S. Appl. No. 11/748,044; U.S. Appl. No. 11/928,533; U.S. Appl. No. 11/928,594; U.S. Appl. No. 11/928,661; U.S. Appl. No. 11/928,758.
Rajwar et al; Virtualizing Transactional Memory; Proceedings of 32nd International Symposium on Computer Arcvhtecture; IEE Jun. 4, 2005-Jun. 8, 2005, U.S. Appl. No. 11/928,594.
Ananian et al; Unbounded Transactional Memory; 11th International Symposium on High-Performance Computer Architecture; IEEE; Mar. 7, 2005; U.S. Appl. No. 11/928,661.
Saha et al; Architectural Support for Software Transactional Memory; 39th Annual IEEE?ACM International Symposium on Microarchitecture; Dec. 9, 2006 Dec. 13, 2006, U.S. Appl. No. 11/928,758.
McDonald et al; Architectural Sematics for Practical Transactional Memory; Proceedings of the 33rd International Symposium on Computer Architecture; IEEE; Jun. 17, 2006-Jun. 21, 2006, U.S. Appl. No. 11/928,758.
Saha et al; McRT-STM; A High Performance Software Transactional Memory System for a Multi-Core RUntime; PPoPP '06; ACM Mar. 29, 2006-Mar. 31, 2006, U.S. Appl. No. 11/928,758.
Mate: Micro Assist Thread Engine; IP)C)M00027405D; IBM; Apr. 7, 2004, U.S. Appl. No. 11/928,758.
Yen et al, LogTM-SE Decoupling Hardware Transactional Memory from Caches, Feb. 14, 2007, 13th Annual International Symposium on High Performance Computer Architecture, U.S. Appl. No. 11/748,044.
U.S.P.T.O. Communication, Final Rejection for U.S. Appl. No. 11/748,044 dated Nov. 10, 2009.
U.S.P.T.O. Communication, Final Rejection for U.S. Appl. No. 11/928,533 dated Apr. 8, 2011.
U.S.P.T.O. Communication, Final Rejection for U.S. Appl. No. 11/928,594 dated Jul. 9, 2010.
U.S.P.T.O. Communication, Final Rejection for U.S. Appl. No. 11/928,661 dated Aug. 27, 2010.
U.S.P.T.O. Communication, Final Rejection for U.S. Appl. No. 11/928,758 dated Jul. 9, 2010.
U.S.P.T.O. Communication, Non-Final Rejection for U.S. Appl. No. 11/748,044 dated Apr. 13, 2011.
U.S.P.T.O. Communication, Non-Final Rejection for U.S. Appl. No. 11/748,044 dated Apr. 14, 2009.

(56) References Cited

OTHER PUBLICATIONS

U.S.P.T.O. Communication, Non-Final Rejection for U.S. Appl. No. 11/928,661 dated Apr. 2, 2010.
U.S.P.T.O. Communication, Non-Final Rejection for U.S. Appl. No. 11/928,758 dated Apr. 16, 2010.
U.S.P.T.O. Communication, Non-Final Rejection for U.S. Appl. No. 11/928,533 dated Oct. 29, 2010.
U.S.P.T.O. Communication, Non-Final Rejection for U.S. Appl. No. 11/928,594 dated Mar. 8, 2010.
U.S.P.T.O. Communication, Notice of Allowance for U.S. Appl. No. 11/928,594 mailed May 25, 2011.
U.S.P.T.O. Communication, Notice of Allowance for U.S. Appl. No. 11/928,661 mailed May 18, 2011.
U.S.P.T.O. Communication, Notice of Allowance for U.S. Appl. No. 11/928,758 mailed Jun. 30, 2011.
PCT/EP2010/062302—International Search Report dated Nov. 22, 2010.
PCT/EP2010/062302—Written Opinion dated Nov. 22, 2010.
U.S.P.T.O. Communication, Requirement/Election for U.S. Appl. No. 11/928,533 dated Jun. 28, 2010.
U.S.P.T.O. Communication, Notice of Allowance for U.S. Appl. No. 11/748,044 mailed Jul. 19, 2012, 12 pages.

* cited by examiner

```
BEGIN_AIG A
INSTRUCTION A0
INSTRUCTION A1
BEGIN_AIG B
INSTRUCTION B0
INSTRUCTION B1
END_AIG B
INSTRUCTION A2
END_AIG A
```

COMPUTING SYSTEM WITH GUEST CODE SUPPORT OF TRANSACTIONAL MEMORY

CROSS-REFERENCE TO RELATED APPLICATIONS

This application is a continuation in part and contains subject matter which is related to the subject matter of the following co-pending applications, each of which is assigned to the same assignee as this application, International Business Machines Corporation of Armonk, N.Y. Each of the below listed applications is hereby incorporated herein by reference in its entirety:

U.S. Ser. No. 11/748,044 filed May 14, 2007, now U.S. Pat. No. 8,321,637 entitled "COMPUTING SYSTEM WITH OPTIMIZED SUPPORT FOR TRANSACTIONAL MEMORY" by Thomas Heller et al.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to a computer system and guest code software written for a given computer on a different computer which executes a different set of instructions; and particularly to a system for instructions used to provide transactional memory instructions on a computer which does not support those instructions natively.

2. Description of Background

Prior-art systems have proposed and provided complicated software and hardware features to support the use of transactional memory. Current software and hardware systems provide for the parallel processing of multiple threads of execution. Software applications can use existing thread libraries, such as the POSIX pthread library, to control the creation of multiple threads of parallel execution. The use of multiple threads works well for applications that operate on easily partitioned tasks and data. Course grain locks can be used to control access to the few shared data structures to prevent rare conflicts between the data updates of multiple threads.

Many software applications contain data structures that must be shared among multiple threads and have frequent concurrent inspections and updates of the shared data structures. These applications require additional modifications in order to obtain good scaling when using large numbers of threads. Applications which use multiple threads of execution that access shared data structures currently require the use of specialized data locking routines in order to produce a reliable outcome that is free from deadlocks and corrupted data. The majority of existing multithreaded applications in this category use fine grained software locks to achieve good performance and correct operation. Writing high performance multithreaded programs which use fine grained software locks is extremely difficult and requires expert programming skills. The lack of these skills in the software industry severely limits the production of multithreaded applications which require the use of shared data structures and therefore the usefulness of multithreaded and multiprocessor computing systems for certain application classes, including many forms of transaction processing.

Various "Transactional Memory" systems have been proposed and built to provide a simpler programming model for constructing multithreaded applications that need to control access to shared data structures. These systems allow software running on one thread of execution to optimistically assume that shared data structures can be updated without conflict with the accesses and updates of other threads of execution. The speculative updates to memory are kept "pending" until the transactional memory system confirms that no conflicts with storage accesses of other threads have occurred. The transactional memory system must be able to discard the pending speculative updates when conflicts between the storage accesses of multiple threads are detected. The existing transactional memory systems range from those that rely completely on new software constructs to those that rely on a mixture of hardware and software to obtain reasonable performance. Some existing systems have very high overhead in terms of the number of instructions executed in support of the required transactional memory behavior. Other existing systems have limitations associated with complex data cache structures that hold the "pending" updates to memory in caches. The cache based systems use many additional cache coherency states which causes a large increase in the design and simulation efforts for those systems.

Recently transactional memory systems have been proposed as illustrated by Microsoft's United States Patent Application Publication No. US2007/0028056 which use software "enlistment records" associated with memory locations that have been accessed by transactions. The Microsoft system also uses a "version value" in the "enlistment record". FIG. 3 of Pub. No. 2007/0028056 includes an operation "Locate enlistment record of memory location". The text describing FIG. 3 gives the example of the enlistment record being part of a software object at the referenced memory address. From Pub. No. 2007/0028056 in paragraph 24, it will be seen that Timothy L. Harris, the Microsoft inventor, indicates that an enlistment record is created with the use of a "software transactional memory interface". The Microsoft Pub. No. 2007/0028056 uses version numbers associated with each enlistment record and needs to deal with cases where the version number exceeds the maximum number supported by the enlistment record. In hindsight, after learning of the details of our invention, it will be recognized that these features of the recent developments in transaction memory systems are not needed and can be improved upon.

SUMMARY OF THE INVENTION

The current invention provides tables of information and a software emulation program to enable better performance when old hardware is used to run new software that uses transactional memory. By creation through emulation of a processing environment with transactional memory each increment of memory can use a bit associated to provide a quick detection of potential conflicts. It is desirable to enable software which uses this type of transactional memory to run on hardware which does not provide some or all of the hardware features otherwise required and this new system provides increased performance while executing guest code that includes the use of transactional memory constructs. This can be enabled by using software and effectively executing the transactional memory constructs.

Information in the guest state is used to determine which of multiple routines will be used to implement instruction loads and stores that are part of transactions in the guest code to be effectively executed.

The current invention uses a portion of host memory to keep tables of transactional memory information and to keep the additional guest state information that is required by the invention. A portion of host memory is also used to store the emulation routines.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

Although not part of the prior art, a proposal could be made to emulate a transactional memory system like that of Timothy L Harris' Pub. No. 2007/0028056 could consider use of the IBM emulation technology to emulate guest instructions on a computing system containing processors which cannot execute the guest instructions directly as in the system described in IBM's patent application Ser. No. 11/680,703 for employing a data structure of readily accessible units of memory to facilitate memory, or Apple emulation technology as described in the U.S. Pat. No. 5,574,873 of Apple Computer's inventor Gary G Davidian which has been cited in many later patents as it taught Decoding guest instruction to directly access emulation routines that emulate the guest instructions. Most likely the Apple system would be chosen as it uses an emulation routine store optimized by dividing it into a dispatch table having a set of dispatch entries and an emulation routine store storing a set of emulation entries, because of the similarity to the software "enlistment records" associated with memory locations that have been accessed by transactions of the Microsoft system. There would be no advantage to using the routines of Microsoft in a "Microprocessor implemented data processing system capable of emulating execution of special instructions not within the established microprocessor instruction set by switching access from a main store portion of a memory" as described by Buonomo et al in U.S. Pat. No. 4,972,317.

However, such an attempt would not be workable to implement our invention and would prove it is difficult to provide acceptable performance while emulating transactional memory operations using the Apple or IBM earlier methods or any of the similar existing methods. The performance of such emulation would be very slow compared to native hardware systems that use additional hardware to speed many common transactional memory operations and as compared to our improvement.

It is desirable to provide a system that provides increased performance while executing guest code that includes the use of transactional memory constructs.

As a result of the summarized invention, technically we have achieved a solution which provides a much faster transactional memory system with much less overhead when compared to existing systems, if such systems can be made to utilize transactional memory. The current invention is also an improvement over existing hardware based transactional memory systems that rely on changes to cache coherence protocols. It allows use of readily available commercial hardware systems to deal with transactions which are long enough to overflow average size caches and doesn't involve virtual memory management overhead. The current invention has a much lower level of hardware complexity, indeed being applicable to many existing systems today when emulation is employed, and is easier to implement and verify via simulation or use of the emulation itself. It also allows for the ability to detect conflicts at a finer granularity than the cache line granularity of prior art systems that are tightly coupled with data caches. The current invention also allows for the fast execution of nested transactions.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
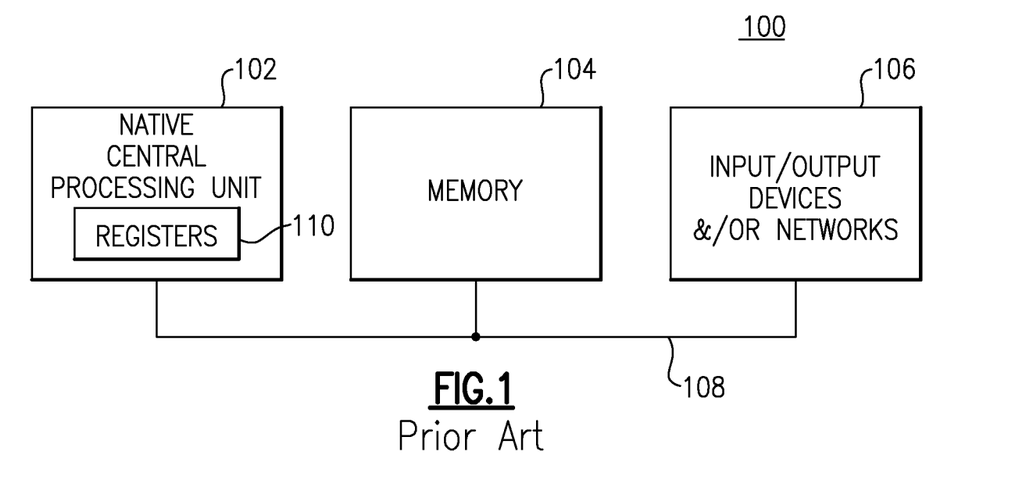
FIG. 1 illustrates one example of an existing system which can use the inventions described herein.

FIG. 1 illustrates one example of an existing system which can use the inventions described herein. Illustrated in FIG. 1 is a commercial Power system, of the kind sold by International Business Machines consistent with Power.org standards. Power.org is a community of companies driving collaborative innovation around Power Architecture™ technology. FIG. 1 represents the new POWER6 processor and planned AIX 6 operating system (planned availability 2H2007)* which can be downloaded without charge in its beta version at the time of filing of this application. This would be our preferred embodiment. However, alternatively, IBM System p5 570 can be used with the AIX 5L or Linux on System p operating systems and with the guest code provided as a result of our invention illustrated by FIGS. 7 and 8 herein. The present invention illustrated in FIG. 1 allows memory 104 (as expanded in FIG. 1A) of a processing environment to associate physical memory array stores' transaction data and guest memory PTRAN bits for each guest of a native architecture.

Processing environment (100) includes a native processor (102) such as the IBM System p 570 with new POWER6 processor, with its memory (104) of up to 768 GB of DDR2 memory with memory frequencies of up to 667 MHz and one or more input/output devices and/or networks (106) coupled to one another via one or more buses (108) or other connections which need be no different than other processing environments, such as the POWER pSystems of IBM p6 570 systems provides, which is uses to create the computer system described herein with the new guest code in the preferred environment illustrated here.

The interconnection element (108) can be implemented as a shared bus or crossbar switch. The invention applies to systems which use any other scheme of interconnecting physical memory to a multiprocessor system which may be implemented in one or more chips. The memory could be broken down into smaller portions and distributed across private connections to each of the CPU chips as done for the IBM Systems using the Power4 microprocessor or for the AMD Opteron based servers. The microprocessors and memory controllers may be located together on a single silicon chip or they may be spread across multiple chips.

The physical memory of the computing system is divided into n increments. One or more "private to transaction" bits (PTRAN) associated with every increment of real system memory are provided for each of the n increments. The invention allows for the choice of any memory increment size and the best choice will depend on workload characteristics, hardware costs and data caching structure used in the target system. An increment of 16 bytes is used in the illustrated embodiment. The PTRAN bit(s) are used to indicate whether (or not) a data entry in memory is part of the speculative memory state of an uncommitted transaction that is currently active in the system. The invention provides a structure program code logic providing information tables and emulation of software written for a given computer, which can be run on a different computer which executes a different set of instructions, or on a version of the computer which does not natively implement PTRAN bits for transactional memory for executing transactional memory constructs. The guest code new emulating instructions are used to provide transactional memory instructions on a computer which does not support those instructions natively.

Figure 4:
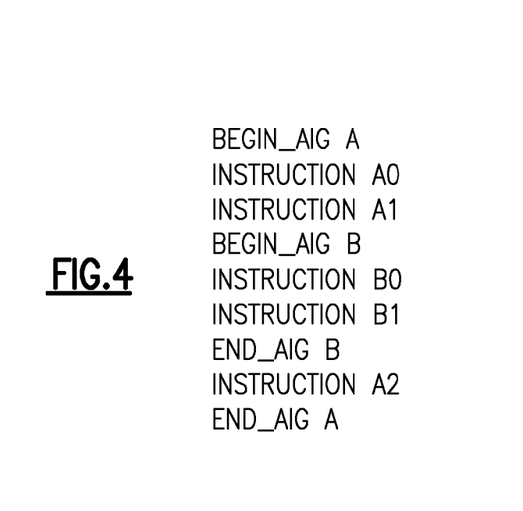
FIG. 4 illustrates an example of guest code including new instructions which are used to implement a transactional memory and how nested transactions are identified.

Special guest code new instructions (BEGIN_AIG, END_AIG) as illustrated by the Nested AIG code sequence of FIG. 4 are used to mark the beginning and end of a group of instructions. The instructions which execute between the special new instructions are referred to as an "Atomic Instruction Group" (AIG) illustrated by AIG instructions shown in FIG. 4 (Instruction A0, Instruction A1, Instruction A2). Additional storage access rules are used when a processor is executing instructions which are part of an Atomic Instruction Group. All of the memory locations modified by the AIG group of instructions are updated in memory in an atomic fashion. The updates to the memory locations are kept "pending" until the processor and/or software application indicates that they should be "committed". All of the updates are either committed to "normal" memory at once or they are discarded. The results are discarded when hardware and/or software detects a conflict between the memory accesses of multiple AIGs that are executing concurrently in the multiprocessor system. The invention provides a way for hardware to quickly detect potential conflicts between the memory accesses of multiple AIGs. Although the invention uses special new instructions to mark the boundaries of a transaction, any other method could be used to identify a group of memory locations that are to be updated in an atomic fashion. The invention is compatible with any number of software interfaces that may be used to implement a transactional memory system. The invention can provide the same fast conflict detection for any system which is attempting to provide an atomic update of multiple memory locations. The invention also applies to systems which mark the boundaries of an instruction group in any other ways, including compiler generated hints attached to other instructions, internal microprocessor commands generated by internal microcode or millicode.

The PTRAN tag is one or more bits associated with an increment in memory which is set for all memory accesses generated by instructions that are part of an Atomic Instruction Group. A processor inspects the bit before attempting to set it; this enables the quick detection of potential conflicts with other AIGs that are concurrently executing on other threads. The setting of the bit may be accomplished by a TS "test and set" operation of the IBM z/Architecture (as described by the IBM z/Architecture Principles of Operation) or any other equivalent operation that enables an atomic update in a multithreaded or multiprocessor system.

Figure 1A:
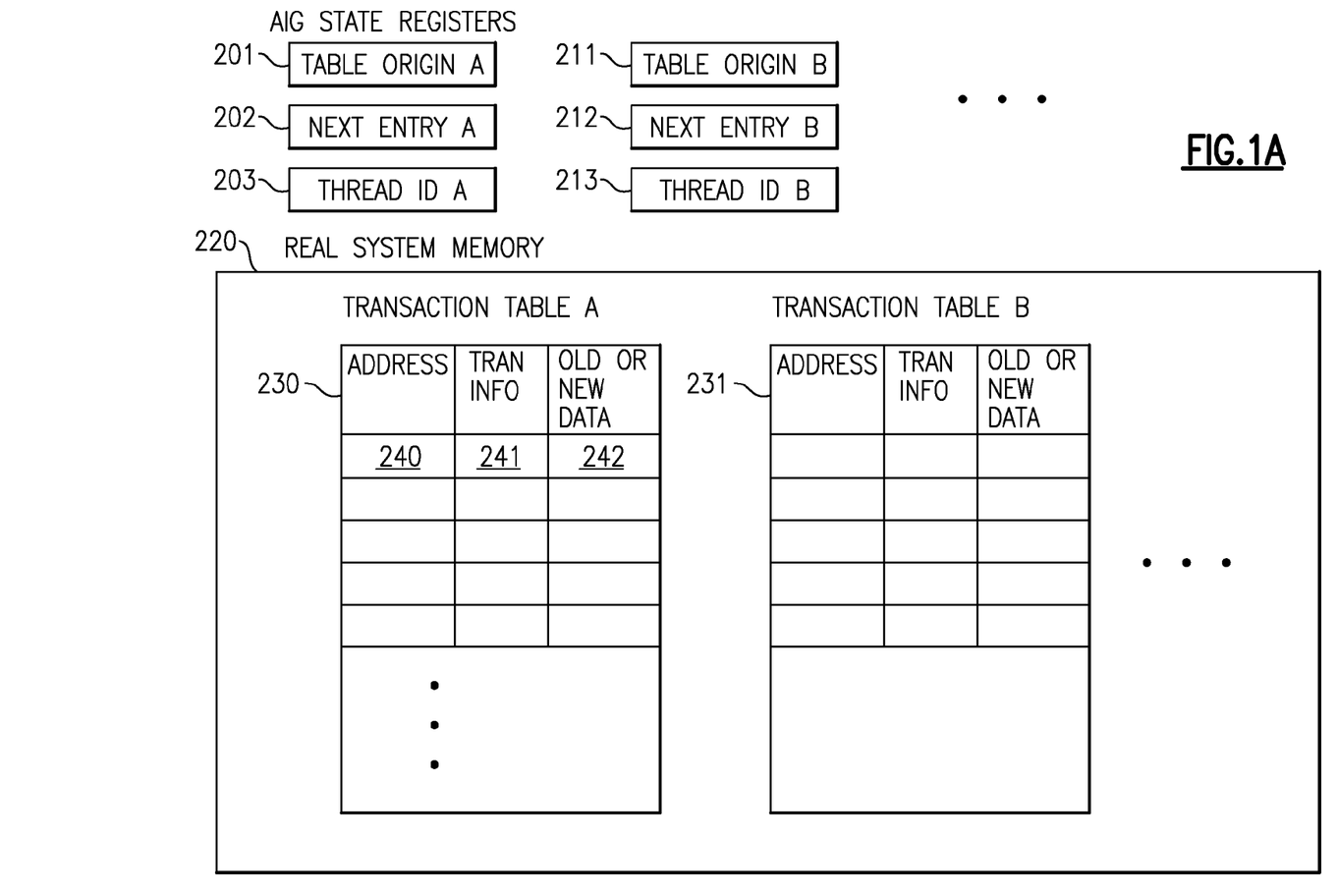

Turning now to FIG. 1A, it will be seen that Transaction Tables (230,231) are created as part of the real system memory (220) which is illustrated here as physical memory. The Transaction Tables could also created in logical or virtual memory. Any system to map the logical system memory to the physical system memory can be used, and there are numerous examples known in the art which can be used, such as those in the IBM zSeries, IBM's p Series, Sun Microsystems' SPARC, Intel's IA32 etc. A Transaction Table entry is made when instructions that are part of an Atomic Instruction Group cause a memory location to be inspected or updated. A Thread ID (203,213) is associated with each Transaction Table. A Next Entry register (202,212) is used as an index into the Transaction Table and indicates which entry should be written next. A Table Origin (201,211) indicates the address of the first entry of the Transaction Table for its thread (203, 213). The Transaction Table is used to hold additional information beyond the simple information that is associated with the PTRAN tag bit or bits that are associated with the memory location that has been inspected or updated. This additional information is related to the speculative state associated with an Atomic Instruction Group. In an illustrated IBM zSeries or pSeries CPU (100, 101, 102) embodiment which we describe here we prefer to use a single PTRAN bit. In this case the Transaction Table will contain all additional information about the speculative state, therefore the PTRAN bit will only indicate that a physical address is involved in an AIG. This is illustrated for Transaction Table A (230) as the address (240), the transaction info identifier (241) and old or new data (242). Other embodiments of the current invention may use additional PTRAN bits which can be used by hardware or software to speed the processing of certain events involved in the processing of Atomic Instruction Groups or the speculative states of any other transactional memory system. The combination of using just a single bit in memory and associating that bit with a more complete description of the transactional state in the Transaction Tables provides a transactional memory system which requires very little hardware overhead without incurring the performance penalty seen in prior-art software transactional memory systems.

Turning again to FIG. 1A, it will be seen as we said that an entry in the Transaction Table, A for example (230), comprises the address (240) that has been inspected or updated inside of an AIG, a Tran Info field (241) and a Data Field (242). A store instruction that is part of an AIG will cause the system to copy the "old" data value from the original memory location to the Transaction Table entry for that address and the new speculative data is placed in the main memory location.

The invention can be made to work with the new values held in the Transaction Table if desired. The preferred embodiment places the "old" data value in the transaction table. This allows the system to be optimized for the case where most transactions are successful. The old data can be discarded quickly when it is no longer needed, when a transaction is committed permanently to memory, by changing the pointer to the transaction table or by clearing the contents of the transaction table. The Tran Info field of a Transaction Table entry (241) includes any transaction information that is needed to make detailed decisions about the need to cause a transaction failure. It also has provisions for additional information to allow efficient support of nested transactions, virtualized transactions or other extensions of the transactional memory architecture. In the preferred embodiment, the Tran Info field includes an indication of whether the memory access of the associated address (240) was a load type access or a store type access. The Tran Info field (240) can also indicate whether the address is shared among multiple AIGs in the system.

It will be seen that in FIG. 1 there is one embodiment of a processing environment to incorporate and use one or more aspects of the present invention. In this example, a processing environment 100 is based on one architecture, which may be referred to as a native architecture, but guest code 210 provided hereby implements another architecture, which may be referred to as a guest architecture. As examples, the native architecture is the PowerPC architecture offered by International Business Machines Corporation or an Intel architecture offered by Intel Corporation and the guest architecture is a new architecture similar to the PowerPC architecture with the addition of instructions to support transactional memory programming constructs.

Using this basic structure we can implement a new transactional memory processing environment. The shortcomings of the prior art are overcome and additional advantages are provided through the provision of a computing system which uses a combination of a "private to transaction" (PTRAN) tag, attached to each increment of real system memory, and a log of speculative loads and stores to provide an improved implementation of a transactional memory system. The current invention uses a log with the added mark bit employed as a "private to transaction" (PTRAN) tag and associated with every increment of real system memory. The use of the tag in memory and associated conflict detection included in this invention provides a much faster transactional memory system with much less overhead when compared to existing systems. The complexity of the current invention is lower than prior attempts at using additional cache coherency states for conflict detection, especially for systems with large numbers of processors and associated interconnections.

The current invention uses the main memory array of the computing system to hold the speculative data and can support very long transactions. The current invention can benefit from the use of data caches but it does not require their use. The current invention provides the ability to check the address of a new memory access without a long search process for common cases. Likewise, it is an improvement over software only transactional memory systems since the conflict detection and use of the tag in memory eliminates some of the software overhead associated with tracking the speculative state of transactions. It also provides the ability to detect memory conflicts at a very fine level (down to a single byte) as opposed to prior art software systems that track updates to entire software objects which may be hundreds or thousands of bytes. Existing software systems will either give frequent over-indication of potential data conflicts or incur very large software path length penalties when attempting to track the updates to individual components of software objects.

Many software interfaces and instruction set modifications have been proposed for the support of transactional memory. The current invention can be used in combination with any of them in order to provide high performance transactional memory operations without incurring a large increase in hardware or software complexity. The preferred embodiment is described for the PowerPC architecture but anyone skilled in the art could apply the same approach to any other architecture such as IBM's zSeries, IBM's pSeries with the P3, P4, P5, P6 processors, and even IBM's System 38 and its AS/400 which have a memory work of 65 bits could utilize the support of this invention, as well as other computer systems, such as Sun Microsystems' SPARC, Intel's IA32 etc. Anyone skilled in the art could extend the current invention for use with other Application Programming Interfaces (APIs) that may be created for other specialized versions of transactional memory implementations.

The current invention uses a Guest PTRAN bit or bits associated with all memory locations, not just those that are currently part of an active transaction, particularly by loading and storing the correct bits in the entries held in the new Guest PTRAN bit table in memory. This allows our emulator to use host memory as a virtual replacement for the PTRAN bits when the native hardware does not provide them. The current invention uses the added PTRAN bit or bits to provide much faster execution of transactions than that which can be obtained using Microsoft's Pub. No. 2007/0028056. The current invention uses an improved transaction table as a log to optimize the memory usage and provides a system which uses less memory than would be used by other systems like the Microsoft proposal, yet the invention can execute applications developed for the Microsoft proposal. The current invention provides one or more PTRAN bits for every memory increment. This provides for the use of multiple Guest PTRAN bits per memory increment.

Native central processing unit (102) represented by a POWER processing system preferably compatible with the standards of Power.org c/o IEEE-ISTO 445 Hoes Lane, Piscataway, N.J. 08854 (New Jersey, USA) and includes as shown in FIG. 1 one or more native registers (110) such as one or more general purpose registers and/or one or more special purpose registers, used during processing within the environment. These registers include information that represent the state of the environment at any particular point in time.

Figure 2:
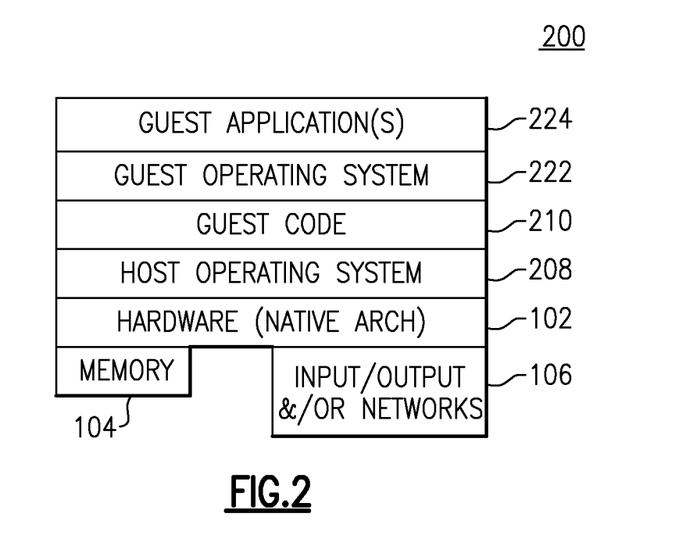
FIG. 2 illustrates one example of the system architecture (200) which includes a plurality of implementation layers, which define the architected aspects of the environment, and supplies the transactional memory guest code described herein.

Referring to FIG. 2, one embodiment of a system architecture (200) of processing environment (100) is described. System architecture (200) includes a plurality of implementation layers, which define the architected aspects of the environment. In this particular example, the layers include hardware (102), which is coupled to memory (104) and input/output devices and/or networks (106) via one or more interfaces and/or controllers (within the 106 unit); a host operating system (208); and the guest code (210) created as a result of this invention; a guest operating system (222); and one or more guest applications (224); as examples. One layer is coupled to a least one other layer via one or more interfaces within the system architecture 200 of the processing environment 100. For instance, guest applications (224) are coupled to guest operating system (222) via the illustrated at least one interface. Other interfaces are used to couple the other layers. Moreover, the architecture can also include other layers and/ or interfaces. Various of the layers depicted in FIG. 2 are further described below.

Hardware 200 is the native architecture of the processing environment and is based on, for instance, the PowerPC architecture. Running on the hardware is a host operating system (202) such as AIX offered by International Business Machines Corporation. The guest code (210) includes a number of components used to implement an architecture that differs from the native architecture. In this embodiment, the architecture can be emulated or interpreted and is an extension of the PowerPC architecture that includes instructions that can be used to provide a transactional memory programming model. The emulation or interpretation effectively enables a guest operating system (222) to execute on the native architecture and enables the support of one or more guest applications (224).

Figure 3:
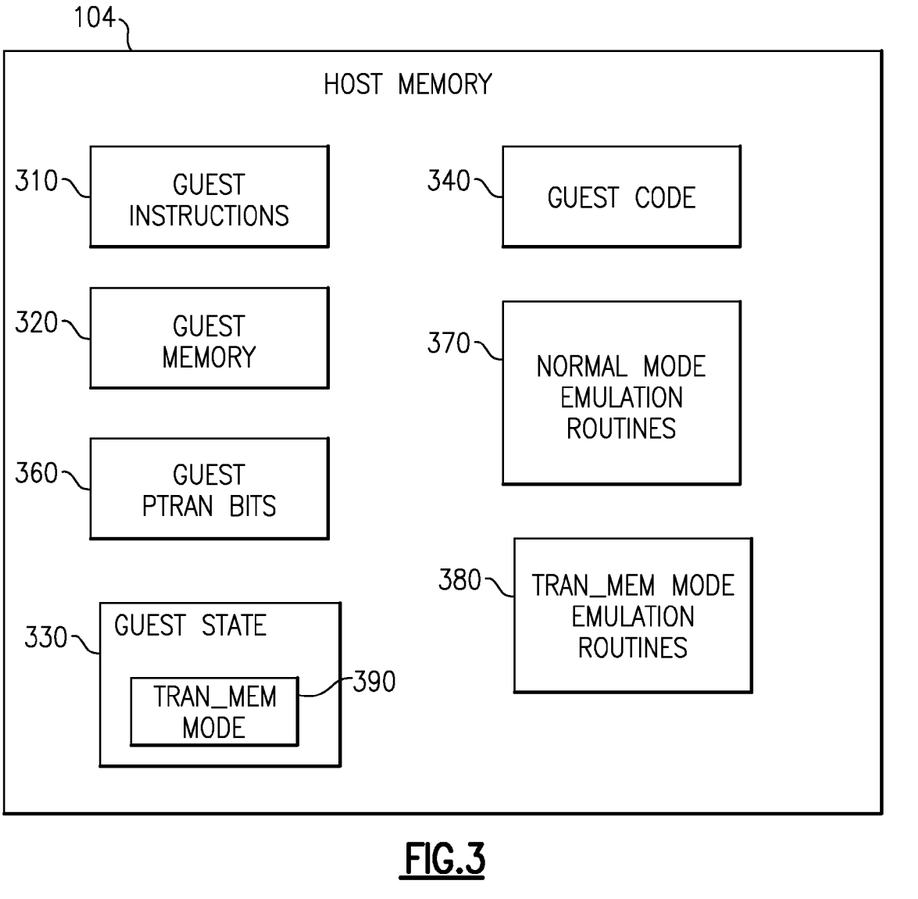
FIG. 3 illustrates additional detail of the host's memory.

FIG. 3 shows additional detail of the host's memory (104). Portions of the host's memory are used for one or more sets of guest instructions (310). Other portions of the memory are used for one or more instances of guest memory (320) and guest state (330). The guest code software code (340) is also kept in host memory. Decisions about whether or not a memory address belongs to an AIG (350) are made. The current embodiment effectively emulates or interprets the hardware required by the guest program for the execution of instructions relating to transactional memory support. The preferred embodiment provides a set of guest memory PTRAN bits (360) for each guest. These bits are used by transactions during the execution of loads and store instructions during an active transaction. Emulation routines are also kept in the host memory. The normal emulation routines (370) are used by the emulator to translate guest instructions into native instructions. The TRAN_MEM mode routines (380) are used by the emulator to translate a subset of guest instructions when the guest state indicates that the TRAN_MEM mode (390) is active.

The guest PTRAN Bits (360) are used by the system to provide a transactional memory programming model. One guest PTRAN bit is provided for each increment of guest memory (320). The increment size in our preferred embodiment is 16 B but any other increment may be used. The guest PTRAN bits (360) may be allocated in host memory at the same time that the guest memory (320) is allocated. The preferred embodiment provides a transactional memory model for all of guest memory (320). Other embodiments may only allocate enough PTRAN bits to provide a transactional memory model for a portion of guest memory. If a particular guest does not use transactional memory then no PTRAN bits may be allocated for that guest. The preferred embodiment provides one guest PTRAN bit for each 16 B increment of guest memory (320) and therefore can use a simple index based on the guest memory address in order to access the associated guest PTRAN bit for any particular guest memory increment. If the guest memory increment to be accessed is the 4th 16 B within the guest memory (320), for example, then the 4th bit in the guest PTRAN bits (360) is inspected as part of the transactional memory controls.

FIG. 4 shows an example of guest code including new instructions which are used to implement a transactional memory.

The current invention supports the execution of "nested" transactions as illustrated by FIG. 4. A nested second AIG may be included within the scope of the first AIG as shown in FIG. 4. Each BEGIN_AIG special instruction (FIG. 4) statement causes the system to create a Transaction Table (230) and to associate the table with the AIG. Decisions about whether or not a memory address belongs to an AIG may include the inner AIG (A) or the combination of the inner and outer AIGs (A & B). The END-AIG special instruction statement (FIG. 4) ends the transaction sequence, but as shown, a sequence for a specific transaction (Transaction B) may be nested within another sequence (Transaction A) The use of multiple Transaction Tables (230) may be used to support many nesting architectures for transactional memory. Multiple versions of the "old data" may be stored in any number of Transaction Tables (230) at any nesting depth. Prior-art transactional memory systems that rely on data caches to hold speculative state are unable to provide similar support for nested transactions without adding additional state information to cache directories and adding additional complexity to the cache coherency protocol. Nesting support on prior-art systems would impose a large hardware complexity penalty on those designs. The current invention can also be extended to include a combined Transaction Table that includes entries from both the inner AIG (Instruction B0, Instruction B1) and the outer AIG (Instruction A0, Instruction A1, Instruction A2). This Combined Transaction Table may be used in place of the individual Transaction Tables or in addition to the individual Transaction Tables.

Figure 5:
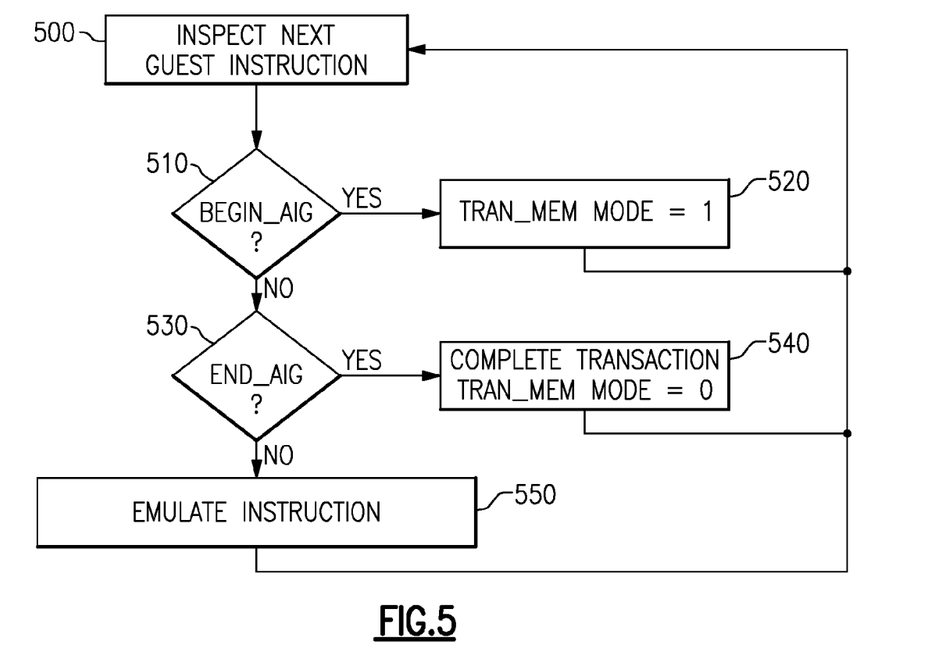
FIG. 5 illustrates how guest instructions are read from memory.

FIG. 5 shows how guest instructions are read from memory (500). A decision is made based on the type of each guest instruction that is to be emulated (510). If the instruction is a BEGIN_AIG then the TRAN_MEM mode associated with the current guest state is set (520). Otherwise, if the instruction is an END_AIG (530) the mode associated with the current guest state is reset (540) after the transaction has been completed. If the instruction to be emulated is not a BEGIN_AIG or END_AIG instruction then the TRAN_MEM mode is not changed and the instruction is emulated (550) according to the current setting of the guest's TRAN_MEM mode.

Figure 6:
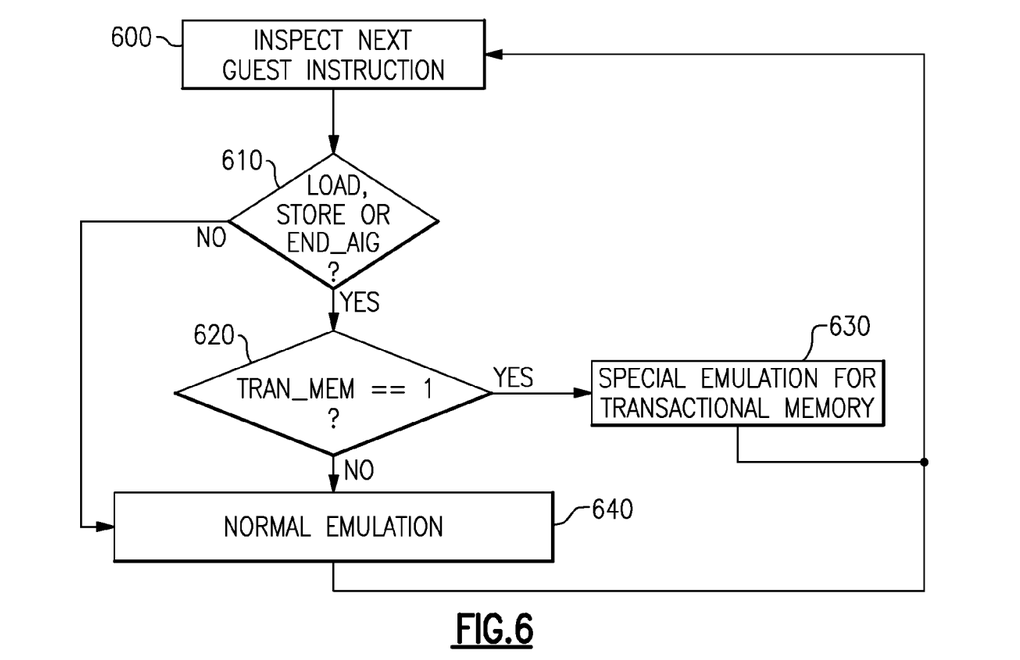
FIG. 6 illustrates how the emulator uses the guest TRAN_MEM mode to control how the native instructions are generated.

FIG. 6 illustrates how the emulator program uses the guest TRAN_MEM mode to control how the native instructions are generated. A guest instruction is read from memory and inspected (600). A decision is made based on the type of instruction (610). If the instruction is a Load, Store or END_AIG instruction then the guest TRAN_MEM mode is inspected (620). If the guest TRAN_MEM mode is set then the emulator will insert special code (630) for the instructions which implement special transactional memory storage access rules for the loads and stores. The emulator will also insert special code for the completion of an AIG when an END_AIG instruction is being processed. Other implementations of the current invention may provide special emulation code for other specialized instructions related to the transactional memory operations. Some examples of such specialized instruction include an explicit transaction rollback, a temporary suspension of the transactional memory mode, nested transaction support. If the guest TRAN_MEM mode is not set then normal, non-transactional memory code is generated by the emulator (640). After the emulator has processed the instruction by either inserting normal emulation code (640) or special transactional memory code (630) the emulator inspects the next guest instruction (610) and repeats the process.

Figure 7:
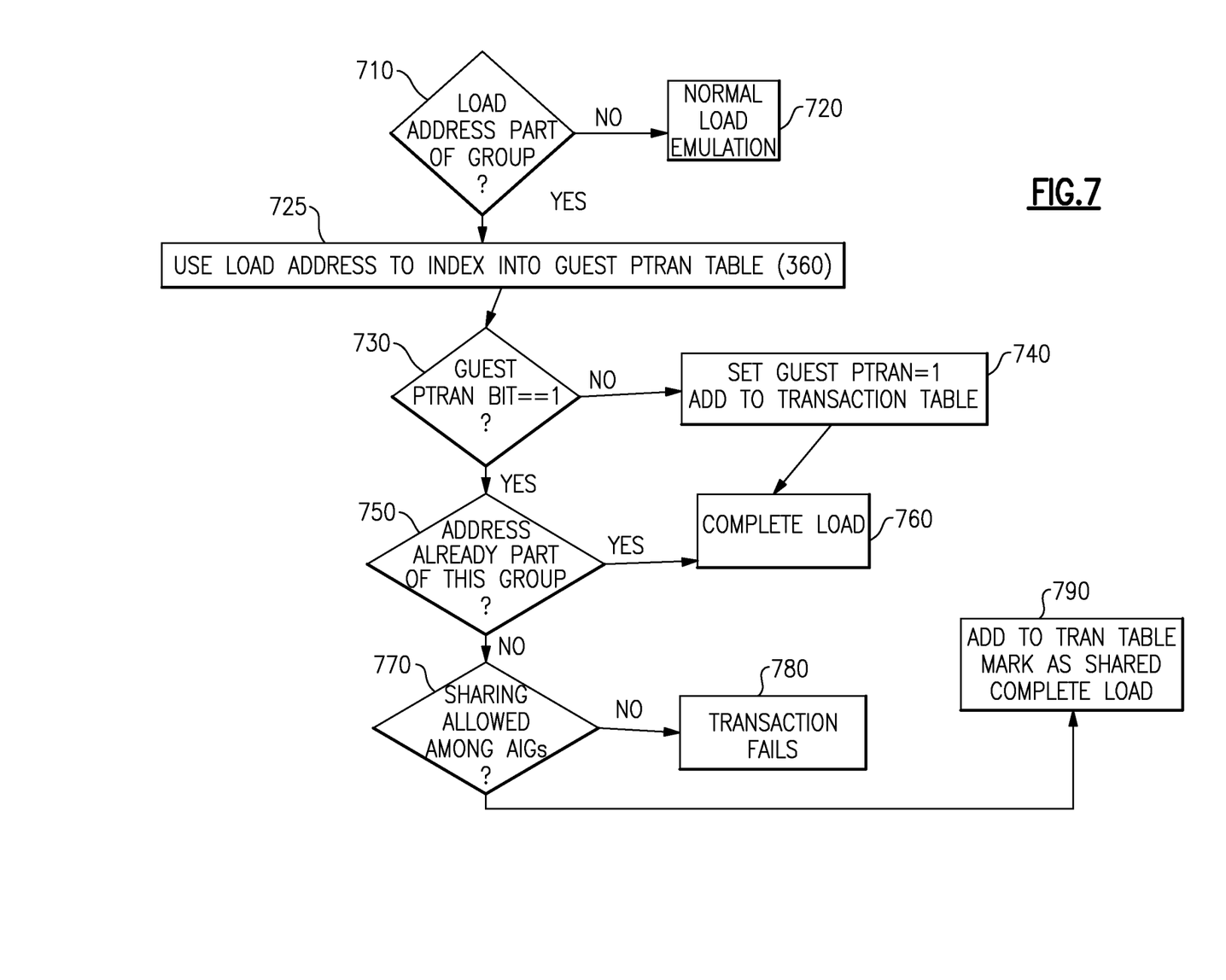
FIG. 7 illustrates the load emulation flowchart for the actions for tracking a speculative state using the Guest PTRAN bit and the Transaction Tables.
Figure 8:
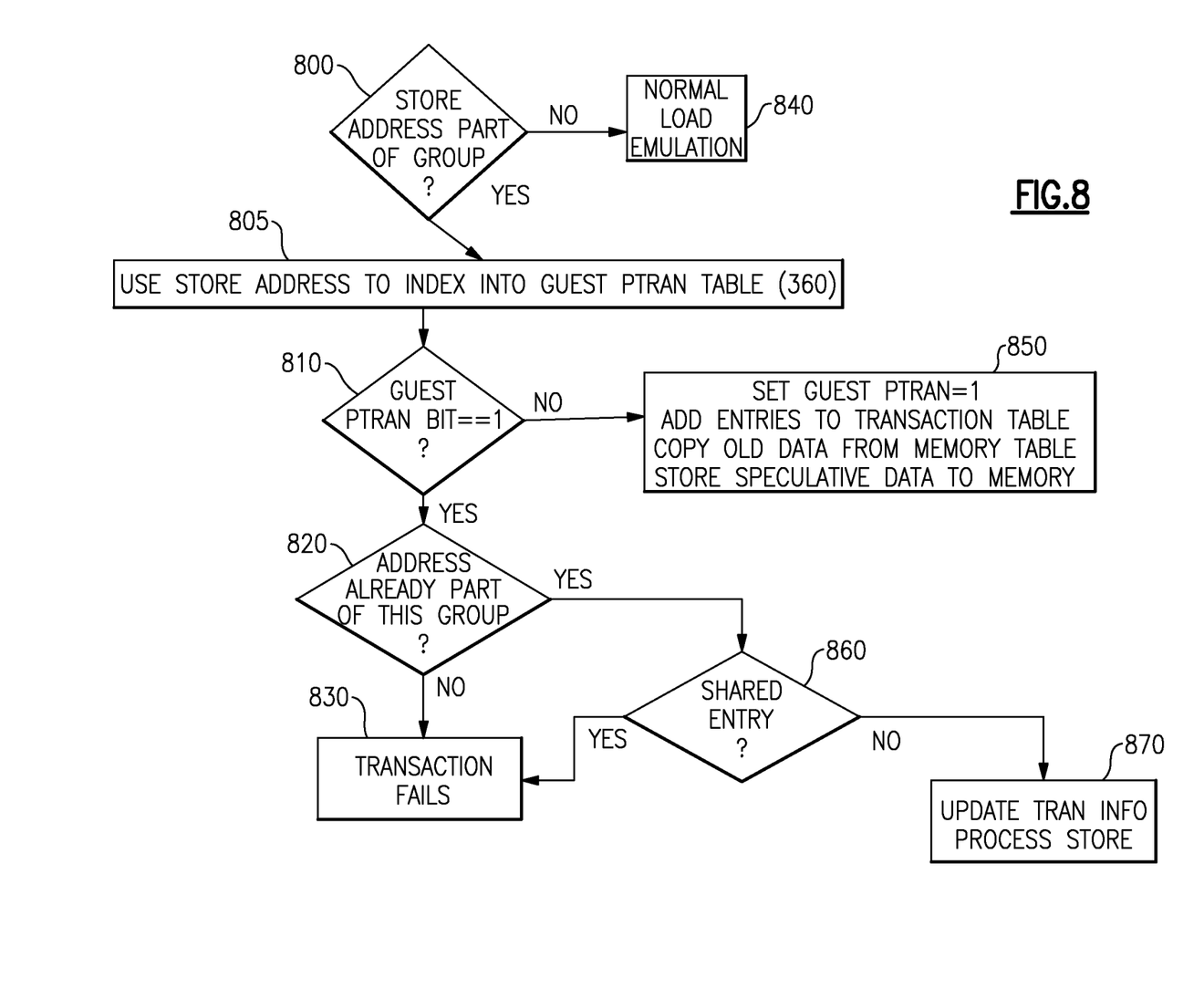
FIG. 8 illustrates a Store Emulation Flowchart that shows the actions for processing a store that is part of an AIG during the emulation of a transaction.

The special emulator code (630), that is used for emulating loads and stores that occur while the guest is in the TRAN_MEM mode, must implement the processing steps described in FIG. 7 and FIG. 8. In the current invention the setting and resetting of the Guest PTRAN bit described in those figures will be accomplished by loading and storing the correct bits in the entries held in the new Guest PTRAN bit table in memory (360). This allows the emulator to use host memory as a virtual replacement for the PTRAN bits when the native hardware does not provide them. The Guest PTRAN bit table (360) is indexed with the guest real address of the load or store to be emulated. The preferred embodiment provides one bit in the table for every quadword of guest real memory. Additional bits per quadword may be used in other implementations of the invention, they may indicate other aspects of the transactional memory state if desired. The preferred embodiment provides a Guest PTRAN bit for each quadword of memory, other implementations may use a different granularity such as doubleword or 128 bytes.

If multiple guests use the same shared memory then they will also share the same Guest PTRAN bit table. The preferred embodiment uses one table of Guest PTRAN bits for all of the guest programs that share a single address space.

FIG. 7 shows the load emulation flowchart for the actions for tracking a speculative state using the Guest PTRAN bit and the Transaction Tables. When a processor attempts a load type access, initially a decision (710) is made to determine whether the load access address is part of an AIG and whether the special storage access rules for AIG accesses apply. If not, normal load processing applies and a normal load emulation (720) operation is followed. Whether or not a load type access is part of an AIG may be determined in many different ways in the decision process step (710). A mode bit may be set in the processor pipeline or in load/store units to indicate that a special AIG mode of operation is active. The mode may be part of the physical state of the processor or the logical state of a virtual processor. If the special mode of operation is not active then the load is treated as a normal load (720).

An "override" of this "AIG active mode" may be provided. The override could be associated with the logical memory segment or logical memory page which contains the target address. An override forces the system to treat the storage request as normal in spite of the fact that the request is part of an AIG. If the override is active then the result of the decision (710) will cause normal processing (720) to take place. Assuming that an AIG is active and the override is not, then the associated Guest PTRAN bit is inspected at an inspection step (730). A load instruction inside of an AIG detects upon inspection the state of the Guest PTRAN bit. When the Guest PTRAN bit is already set (730) it is due possibly to the actions of another thread executing on the same processor or on another processor. If at the inspection step 730 it is found that the Guest PTRAN bit is not set (740) then the processor sets the Guest PTRAN bit and make a record of the access in the Transaction Table (730) for the active AIG by adding to the Transaction Table at the Set Guest PTRAN step (740) and then the complete load can continue (760). If the Guest PTRAN bit is already set, the address which caused this potential conflict is compared with the addresses already entered in the processor's Transaction Table. If the Guest PTRAN bit was set when tested at the inspection step (730) by another load earlier in the same AIG, it is already part of the AIG as tested and determined (750) and then the complete load may continue (760). Each Transaction Table (230, 231) contains the addresses for a particular AIG. Accordingly, if the address was not already part of the AIG as tested and determined (750) then the address for the load is not found in the processor's Transaction Table and then the processor checks whether the address is enabled for sharing among AIGs in a determination step for AIG sharing (770). If the address is not currently enabled for sharing among multiple AIGs the processor may signal other processors in the system to request a "shared AIG access" for this address during the determination step whether sharing is allowed among AIGs (770). A shared access can be granted if no other AIG in the system has speculatively written the storage location. If the shared access is not granted then the AIG fails (780), otherwise (790) the load address is added to the Transaction Table (230) and the Tran Info field (241) is updated to indicate that the address is a load access that is shared among multiple AIGs in the system.

The FIG. 8 Store Emulation Flowchart shows the actions for processing a store that is part of an AIG during the emulation of a transaction. When a processor attempts a store type access initially a store decision (800) is made to determine whether the access is part of an AIG and whether the special storage access rules for AIG accesses apply. The mode of the processor is checked in a similar method as previously described for load accesses. If the special mode of operation, under which the special access rules for AIG accesses apply, is not active then the store is treated as a normal store (840). Assuming that an AIG is active, the associated Guest PTRAN bit is inspected at the store process inspection step (810). If the Guest PTRAN bit is not already set then the Guest PTRAN bit is set at the store transaction step (850) and a new entry is added to the Transaction Table (830). The "old data" is moved to the Transaction Table entry (242), the address is written to the new entry (240) and the Tran Info field (241) is updated. The Tran Info field (241) is marked to indicate that the access associated with this entry was a store type access. The new store data is written to memory after the setting of the Guest PTRAN bit is completed. If the inspection of the Guest PTRAN bit (810) indicates that the bit was already set then a decision (820) is made based on whether the current store address is already part of an AIG which is active on the processor. The Transaction Table (230) for the processor is examined, if it is determined that the address is present in the Transaction Table then the Tran Info (241) for the entry is checked and a decision as to shared access entry (860) is made. If the Tran Info indicates that the entry is a load type access entry that is shared among multiple AIGs, the transaction fails (830) otherwise the Tran Info field for the associated entry is updated to indicate a store type access and the store is processed (870).

The capabilities of the present invention can be implemented for a processing environment using software, firmware, hardware or some combination thereof.

As one example, one or more aspects of the present invention can be included in an article of manufacture (e.g., one or more computer program products) having, for instance, computer usable media. The media has tangibly embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:
1. An article of manufacture comprising:
at least one computer usable non-transitory medium having computer readable program code logic tangibly embodied therein the computer readable program code logic configured to facilitate access to a memory of a processing environment, the computer readable code logic configured to cause a processor to perform a method comprising:

providing information tables and a software emulation program that are both configured for enabling hardware that does not natively implement Private to Transaction (PTRAN) bits for executing transactional memory constructs to run new software that uses transactional memory;

associating a directly addressable guest PTRAN bit with each increment of real system memory of the computer system to execute transactional memory constructs for the hardware that does not natively implement PTRAN bits, the guest PTRAN bit providing a transactional memory model for a portion of guest memory;

locating a transaction table and the guest PTRAN bit in the real system memory, the information tables comprising the transaction table;

detecting an instruction that specifies an increment of the computer system's memory is part of a first atomic instruction group (AIG) by the new software;

determining a second AIG is currently accessing the specified increment based on accessing the guest PTRAN bit associated with the specified increment;

updating each of the transaction table and the guest PTRAN bit to indicate that the specified increment is part of the first AIG based on a determination that there is no second AIG currently accessing the specified increment; and based on a determination that the second AIG is currently accessing the specified increment, inspecting the transaction table to determine whether the specified increment is already part of the transaction table.

2. The article of manufacture of claim 1, wherein the memory of the processing environment is accessible by said software emulation program for running said new software which uses transactional memory and the guest PTRAN bit associated with each memory increment of real system memory.

3. The article of manufacture of claim 1, wherein information of said information tables in a guest state determines which of multiple routines implement instruction loads and stores that are part of transactions in guest code of said new software.

4. The article of manufacture of claim 3, wherein the software emulation program runs on one system architecture and emulates a second system architecture for executing transactional memory construction of the processing environment.

5. The article of manufacture of claim 3, wherein said hardware provides real system memory and a portion of said real system memory keeps tables of transactional memory information and said guest state information, the transaction table being part of the tables of transactional memory information.

6. The article of manufacture of claim 5, wherein a portion of the real system memory is also used to store the emulation routines.

7. The article of manufacture of claim 1, wherein designation of a memory increment comprises one or more addresses of the unit of memory.

8. The articles of manufacture of claim 7, wherein the one or more addresses comprises a logical address and a host absolute address of the unit of memory.

9. The articles of manufacture of claim 1, wherein the processing environment is responsive to guest code instructions used to implement a transactional memory, and said guest code determines how nested transactions are identified.

10. The article of manufacture of claim 1 wherein guest instructions are read from memory and a decision is made based upon the type of guest instruction whether a current guest state of the processing environment is set or reset or unchanged.

11. The article of manufacture according to claim 1 wherein a guest TRAN_MEM mode controls how native instructions are generated.

12. The article of manufacture according to claim 1, wherein a speculative state of one or more AIGs is tracked using the Guest PTRAN (Private to Transaction) bit and transaction table.

13. The article of manufacture according to claim 1 wherein the first AIG is marked at a beginning and an end of the first AIG with special guest code new instructions (BEGIN_AIG, END_AIG) which identifies a transaction and a load instruction inside of the first AIG detected upon inspection the state of the Guest PTRAN (Private to Transaction) bit.

14. A method utilizing a processing environment to provide transactional memory instructions on a computer which does not support those instructions natively and does not employ hardware transactional memory, comprising the steps of:

storing computer readable program code logic in a memory buffer of said processing environment which does not employ hardware transactional memory to facilitate access to memory for executing transactional memory constructs, creating information tables as part of the system memory of the processing environment by said computer readable program code as transaction tables for transactional memory, wherein the information tables comprise a transaction table and wherein the transaction table is located in real system memory;

executing a software emulation program to enable said processing environment hardware to run transactional application software using transactional memory and a directly addressable guest Private to Transaction (PTRAN) bit associated with each increment of the real system memory for executing transactional memory constructs for the computer that does not natively implement hardware transactional memory, the guest PTRAN bit providing a transactional memory model for a portion of guest memory;

locating the guest PTRAN bit in the real system memory, the transactional application software configured for detecting an instruction that specifies an increment of the computer system's memory is part of a first atomic instruction group (AIG);

accessing the guest PTRAN bit associated with the specified increment to determine whether a second AIG is currently accessing the specified increment;

updating each of the transaction table and the guest PTRAN bit to indicate the specified increment is part of the first AIG based on a determination that there is no second AIG currently accessing the specified increment; and based on a determination that the second AIG is currently accessing the specified increment, inspecting the transaction table to determine whether the specified increment is already part of the transaction table.

15. The method of claim 14, wherein a guest TRAN_MEM mode controls how native instructions are generated.

16. The method of claim 14, wherein a speculative state of one or more AIGs is tracked using the guest PTRAN bit and transaction table.

17. The method of claim 14, wherein the first AIG is marked at a beginning and an end of the first AIG with special guest code new instructions (BEGIN_AIG, END_AIG) which identifies a transaction and a load instruction inside of the first AIG detected upon inspection the state of the guest PTRAN bit.

18. A computer system for transactional memory processing in a processing environment to provide transactional memory instructions on a computer which does not support those instructions natively, said system comprising:
　a processor environment that includes hardware, firmware and operating system software, and memory to store instructions and data in a buffer; and
　computer readable program code logic tangibly embodied therein stored in said buffer to facilitate access to memory of a processing environment, the computer readable code logic configured to perform the method comprising:
　providing information transaction tables and a software emulation program to enable said computing system's processing environment hardware not employing hardware transactional memory to run transactional application software using transactional memory;
　associating a directly addressable guest Private to Transaction (PTRAN) bit with each increment of real system memory of the computer system for executing transactional memory constructs for the computer that does not natively implement transactional memory instructions, the guest PTRAN bit providing a transactional memory model for a portion of guest memory;
　locating a transaction table and the guest PTRAN bit in the real system memory, the information transaction tables comprising the transaction table;
　detecting by the transactional application software that an instruction that specifies an increment of the computer system's memory is part of a first atomic instruction group (AIG) and accessing the guest PTRAN bit associated with the specified increment to determine whether a second AIG is currently accessing the specified increment;
　updating the transaction table and the guest PTRAN bit to indicate that the specified increment is part of the first AIG based on a determination that there is no second AIG currently accessing the specified increment; and
　based on a determination that the second AIG is currently accessing the specified increment, inspecting the transaction table to determine whether the specified increment is already part of the transaction table.

19. The computer system of claim 18, wherein a guest TRAN_MEM mode controls how native instructions are generated.

20. The computer system of claim 18, wherein a speculative state of one or more AIGs is tracked using the guest PTRAN bit and transaction table.

21. The computer system of claim 18, wherein the first AIG is marked at a beginning and an end of the first AIG with special guest code new instructions (BEGIN_AIG, END_AIG) which identifies a transaction and a load instruction inside of the first AIG detected upon inspection the state of the guest PTRAN bit.

22. A computer system for transactional memory processing in a processing environment to provide transactional memory instructions on a computer which does not support those instructions natively, said system comprising:
　a processing environment including a processor not employing hardware transactional memory, and includes memory to store native and guest instructions and data in a memory buffer that includes a plurality of memory elements,
　a guest TRAN_MEM mode generator to control generation of native instructions;
　guest instructions to determine, based on the type of instruction, whether a guest TRAN_MEM mode is inspected to determine how a guest instruction is executed,
　an emulator to insert special code for said native and guest instructions which implements special transaction memory storage access rules for loads and stores in said processing environment, said emulator to insert either normal emulation code or special transactional memory code upon inspection of a guest instruction, the special transaction memory code configured to perform the method comprising:
　detecting that an instruction that specifies an increment of real system memory is part of a first atomic instruction group (AIG); and
　accessing a guest PTRAN bit associated with the specified increment to determine whether a second AIG is currently accessing the specified increment, one guest PTRAN bit being provided for each increment of guest memory, and a transaction table and the guest PTRAN bit are each updated to indicate that the specified increment is part of the first AIG based on a determination that there is no second AIG currently accessing the specified increment;
　based on a determination that the second AIG is currently accessing the specified increment, inspecting the transaction table to determine whether the specified increment is already part of the transaction table and wherein the transaction table and the guest PTRAN bit are located in the real system memory.

23. The computer system of claim 22, wherein the first AIG is marked at a beginning and an end of the first AIG with special guest code new instructions (BEGIN_AIG, END_AIG) which identifies a transaction and a load instruction inside of the first AIG detected upon inspection the state of the guest PTRAN bit.

24. The computer system of claim 23, wherein the guest TRAN_MEM mode is inspected based on the guest instruction being one of: a load, a store, and the end of the first AIG (END_AIG).

25. A computer system for transactional memory processing in a processing environment to provide transactional memory instructions on a computer which does not support those instructions natively, said system comprising:
　a processing environment that includes a host processor not employing hardware transactional memory and a host memory to store native and guest instructions and data in a memory buffer that includes a plurality of memory elements, and
　an emulator that includes special emulator code configured to perform the method comprising:
　emulating loads and stores that occur based on a guest being in a TRAN_MEM mode to implement setting and resetting of Guest PTRAN (Private to Transaction) by loading and storing correct bits in entries held in a Guest PTRAN bit table in said memory buffer allowing said emulator to use said host memory as a virtual replacement for the Guest PTRAN bits based on the native hardware not providing the Guest PTRAN bits;
　indexing said Guest PTRAN bit table with the guest real address of the load or store to be emulated, and one Guest PTRAN bit being provided for each increment of guest memory;

detecting that an instruction that specifies an increment of the computer system's memory is part of a first atomic instruction group (AIG);

accessing a Guest PTRAN bit associated with the specified increment to determine whether a second AIG is currently accessing the specified increment;

locating the Guest PTRAN bit in the memory buffer and updating the Guest PTRAN bit table and the Guest PTRAN bit to indicate that the specified increment is part of the first AIG based on a determination that there is no second AIG currently accessing the specified increment; and inspecting the Guest PTRAN bit to determine whether the specified increment is already part of the transaction table based on a determination that the second AIG is currently accessing the specified increment.

26. The computer system of claim 25, wherein the first AIG is marked at a beginning and an end of the first AIG with special guest code new instructions (BEGIN_AIG, END_AIG) which identifies a transaction and a load instruction inside of the first AIG detected upon inspection the state of the Guest PTRAN bit.

27. The computer system of claim 26, wherein the TRAN_MEM mode is set based on a guest instruction being the beginning of the first AIG(BEGIN_AIG).

28. The computer system of claim 26, wherein the TRAN_MEM mode is unchanged based on a guest instruction not being the beginning of the first AIG or the end of the first AIG (BEGIN_AIG, END_AIG).

* * * * *